United States Patent
Ahn et al.

(10) Patent No.: US 10,565,691 B2
(45) Date of Patent: Feb. 18, 2020

(54) METHOD OF MULTI-VIEW DEBLURRING FOR 3D SHAPE RECONSTRUCTION, RECORDING MEDIUM AND DEVICE FOR PERFORMING THE METHOD

(71) Applicant: KOREA INSTITUTE OF SCIENCE AND TECHNOLOGY, Seoul (KR)

(72) Inventors: Byeongjoo Ahn, Seoul (KR); Ig Jae Kim, Seoul (KR); Junghyun Cho, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 147 days.

(21) Appl. No.: 15/630,688

(22) Filed: Jun. 22, 2017

(65) Prior Publication Data
US 2018/0061018 A1    Mar. 1, 2018

(30) Foreign Application Priority Data
Aug. 24, 2016  (KR) .................. 10-2016-0107699

(51) Int. Cl.
*G06T 5/00* (2006.01)
*G06T 5/50* (2006.01)
(Continued)

(52) U.S. Cl.
CPC .............. *G06T 5/003* (2013.01); *G06T 5/50* (2013.01); *G06T 7/579* (2017.01); *H04N 13/111* (2018.05);
(Continued)

(58) Field of Classification Search
CPC . G06T 5/003; G06T 5/50; G06T 2207/10012; G06T 7/55; G06T 7/579;
(Continued)

(56) References Cited

U.S. PATENT DOCUMENTS

| 8,270,704 B2 | 9/2012 | Kim et al. |
| 2011/0007072 A1* | 1/2011 | Khan ............... G06T 17/00 345/420 |

(Continued)

FOREIGN PATENT DOCUMENTS

| KR | 100914845 B1 | 8/2009 |
| KR | 1020120106829 A | 9/2012 |

(Continued)

OTHER PUBLICATIONS

Arun, M., A. N. Rajagopalan, and Gunasekaran Seetharaman. "Multi-Shot Deblurring for 3D Scenes." Computer Vision Workshop (ICCVW), 2015 IEEE International Conference on. IEEE, 2015. (Year: 2015).*

(Continued)

*Primary Examiner* — Wesley J Tucker
(74) *Attorney, Agent, or Firm* — Cantor Colburn LLP

(57) ABSTRACT

A method of multi-view deblurring for 3-dimensional (3D) shape reconstruction includes: receiving images captured by multiple synchronized cameras at multiple viewpoints; performing iteratively estimation of depth map, latent image, and 3D motion at each viewpoint for the received images; determining whether image deblurring at each viewpoint is completed; and performing 3D reconstruction based on final depth maps and latent images at each viewpoint. Accordingly, it is possible to achieve accurate deblurring and 3D reconstruction even from any motion blurred images.

17 Claims, 5 Drawing Sheets

(51) Int. Cl.
*H04N 13/122* (2018.01)
*G06T 7/579* (2017.01)
*H04N 13/111* (2018.01)
*H04N 13/243* (2018.01)
*H04N 13/00* (2018.01)

(52) U.S. Cl.
CPC . *H04N 13/122* (2018.05); *G06T 2207/10012* (2013.01); *G06T 2207/10028* (2013.01); *G06T 2207/30201* (2013.01); *H04N 13/243* (2018.05); *H04N 2013/0081* (2013.01); *H04N 2213/003* (2013.01)

(58) Field of Classification Search
CPC ............... G06T 7/593; G06T 7/596; G06T 2207/10028; G06T 2207/30201; H04N 2013/0081; H04N 13/111
USPC .................................................. 382/154, 255
See application file for complete search history.

(56) References Cited

U.S. PATENT DOCUMENTS

| | | | |
|---|---|---|---|
| 2013/0016239 A1 | 1/2013 | Cho et al. | |
| 2016/0012603 A1* | 1/2016 | Unten | G06T 1/0007 382/154 |
| 2016/0093028 A1* | 3/2016 | Xu | G06T 5/003 382/255 |

FOREIGN PATENT DOCUMENTS

| | | | |
|---|---|---|---|
| KR | 1020130007889 A | 1/2013 |
| KR | 1020130079447 A | 7/2013 |
| KR | 101391095 B1 | 4/2014 |
| WO | 2011077177 A1 | 6/2011 |
| WO | 2011150109 A1 | 12/2011 |

OTHER PUBLICATIONS

Lee, Hee Seok, and Kuoung Mu Lee. "Dense 3D Reconstruction from Severely Blurred Images Using a Single Moving Camera." Computer Vision and Pattern Recognition (CVPR), 2013 IEEE Conference on. IEEE, 2013. (Year: 2013).*
Sellent, Anita, Carsten Rother, and Stefan Roth. "Stereo Video Deblurring." arXiv preprint arXiv:1607.08421 (2016). (Year: 2016).*
Xu, Li, and Jiaya Jia. "Depth-aware motion deblurring." Computational Photography (ICCP), 2012 IEEE International Conference on . IEEE, 2012. (Year: 2012).*
Goesele, Michael, Brian Curless, and Steven M. Seitz. "Multi-view stereo revisited." Computer Vision and Pattern Recognition, 2006 IEEE Computer Society Conference on. vol. 2. IEEE, 2006. (Year: 2006).*
Hee Jae Cho, et al., "Video Deblurring Combining 3D Information in Dynamic Enviroments", IPIU 2015.
Ho Yeol Choi, et al., "Multi-View Image Deblurring for 3D Shape Reconstruction", Journal of the Institute of Electronics Engineers for Korea vol. 49, No. 11, 2012.
M. Arun, et al., "Multi-Shot Deblurring for 3D Scenes", IEEE ICCV 2015, 19-27.
Tae Hyun Kim, et al., "Generalized Video Deblurring for Dynamic Scenes", IEEE CVPR 2015, 5426-5434.

* cited by examiner

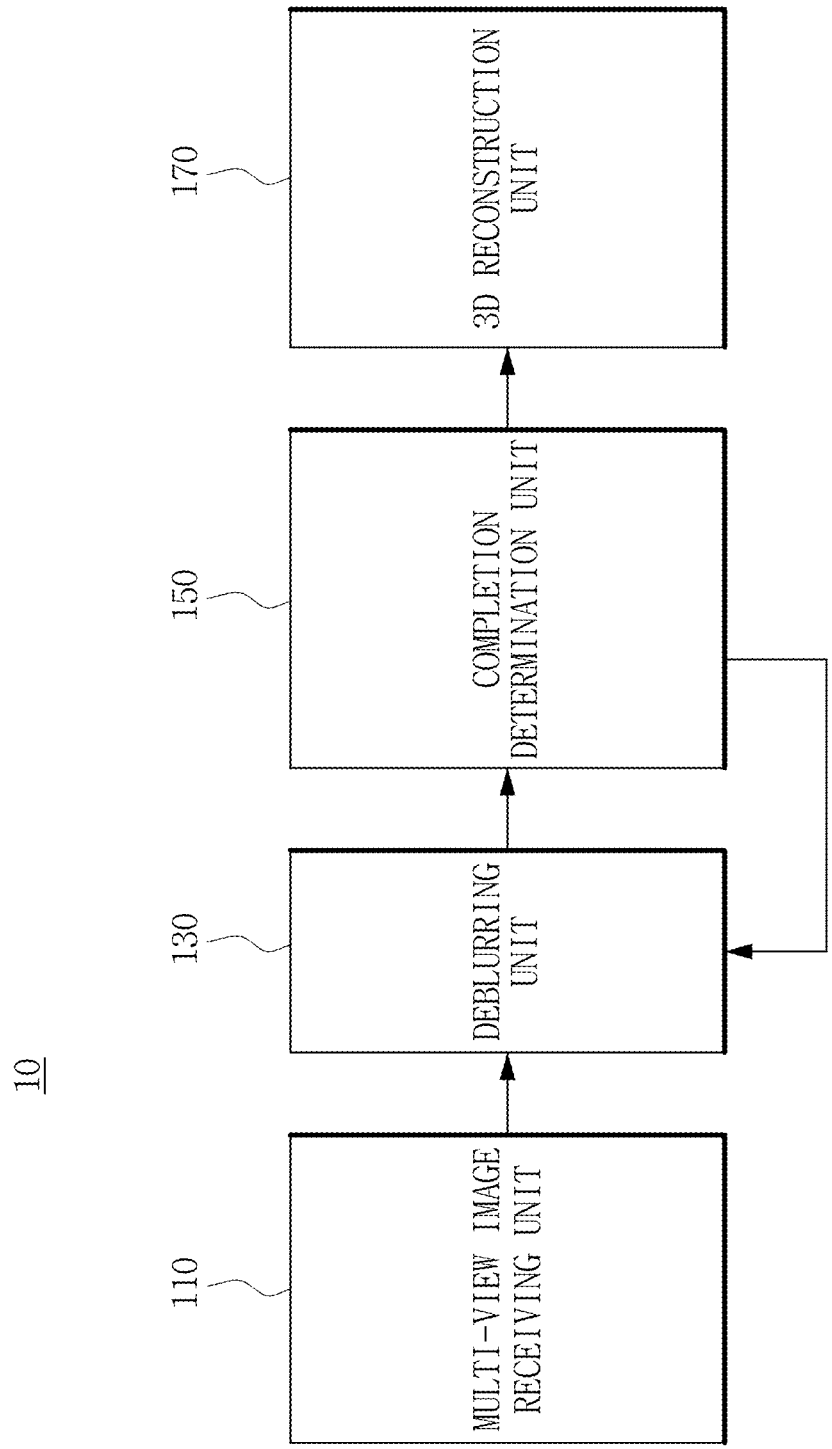

METHOD OF MULTI-VIEW DEBLURRING FOR 3D SHAPE RECONSTRUCTION, RECORDING MEDIUM AND DEVICE FOR PERFORMING THE METHOD

DESCRIPTION OF GOVERNMENT-SPONSORED RESEARCH AND DEVELOPMENT

This research (Development of high-tech technology for imaging and rendering in cooperation with multiple autonomous flying objects for large-scale performance and broadcasting, Project Serial No.: 1375026353) is done in support of Korea Creative Content Agency, Ministry of culture, sports and tourism, under the supervision of Gwangju Institute of Science and Technology.

CROSS-REFERENCE TO RELATED APPLICATION

This application claims priority to Korean Patent Application No. 2016-0107699, filed on Aug. 24, 2016, and all the benefits accruing therefrom under 35 U.S.C. § 119, the contents of which in its entirety are herein incorporated by reference.

BACKGROUND

1. Field

The present disclosure relates to a method of multi-view deblurring for 3-dimensional (3D) shape reconstruction and a recording medium and a device for performing the method, and more particularly, to a new blur model using 3D representation of blur kernel.

2. Description of the Related Art

Motion blur causes various problems in image-based algorithm. In particular, when finding correspondence, motion blur is a critical problem because it violates brightness constancy between images, making it difficult to find correspondence. Thus, in multi-view stereo (hereinafter, MVS) to which finding correspondence is important, motion blur is a significant factor that degrades the quality of results.

Despite its significance, motion blur has not been dealt sufficiently in MVS. It has been dealt in 3-dimensional (3D) reconstruction using a single moving camera, where modeling of motion blur as a function of camera motion and scene depth solved 3D reconstruction and deblurring simultaneously. However, the application of this modeling is limited to static scenes. In dynamic scene, not only camera motion and scene depth but also object motion leads to blur, so this model cannot be applied.

For example, assume 3D facial reconstruction for digital human, and in this case, 3D reconstruction is performed from images captured by multiple synchronized cameras to capture momentary human facial expression. Here, since the cameras are fixed, motion blur is attributable to object motion such as head movement or facial expression change, not attributable to camera motion.

Blur is hardly a problem with expressionless face, but to realize natural facial expression in digital human, it is necessary to capture actual dynamic human facial expressions. Even though illumination conditions are adjusted, motion blur unavoidably occurs in dynamic facial expression change, and thus, it is essential to handle motion blur.

Blur caused by dynamic scenes containing object motion has been rarely inquired in multi-view images, but it was dealt in single image. Linear approximation of blur kernel finds pixel-wise 2D motion and clear images together. In case of multi-view images, this approach can be applied to each image individually to obtain deblurred results.

However, because these deblurring results are not aligned temporally and spatially, an error occurs in 3D reconstruction. A blurry image is a consequence of captured images accumulated through the open shutter of camera, and the deblurring of such an image finds a clear image corresponding to a certain moment in the interval of the opening of the shutter.

If each image is deblurred individually, the result images would correspond to different moments and thereby they would have different spatial positions.

For example, in one view, an image of the moment of opening of shutter may be reconstructed, and in another image, an image of the moment of closing of shutter may be reconstructed. In these cases, geometric consistency between viewpoints is destroyed, causing an error in 3D reconstruction.

SUMMARY

The present disclosure is devised to address these issues, and therefore, the present disclosure is directed to providing a method of multi-view deblurring for 3-dimensional (3D) shape reconstruction with improved performance.

The present disclosure is further directed to providing a recording medium having a computer program recorded thereon for performing the method of multi-view deblurring for 3D shape reconstruction.

The present disclosure is further directed to providing a device for performing the method of multi-view deblurring for 3D shape reconstruction.

To achieve the object of the present disclosure, a method of multi-view deblurring for 3D shape reconstruction according to an embodiment includes: receiving images captured by multiple synchronized cameras at multiple viewpoints; performing iteratively estimation of depth map, latent image, and 3D motion at each viewpoint for the received images; determining whether image deblurring at each viewpoint is completed; and performing 3D reconstruction based on final depth maps and latent images at each viewpoint.

In an embodiment of the present disclosure, the determining whether image deblurring at each viewpoint is completed may include determining whether estimation of depth map, latent image, and 3D motion at each viewpoint is performed a preset number of times.

In an embodiment of the present disclosure, the performing iteratively estimation of depth map, latent image, and 3D motion at each viewpoint for the received images may be based on one reference view from the multiple viewpoints for the depth map and the 3D motion.

In an embodiment of the present disclosure, the 3D motion may be represented as a 3D vector.

In an embodiment of the present disclosure, the performing iteratively estimation of depth map, latent image, and 3D motion at each viewpoint for the received images may use an energy model integrating image deblurring and 3D reconstruction.

In an embodiment of the present disclosure, the energy model may be expressed as the following Equation:

$$E = E_{blur} + E_{MV} + E_{reg}$$

where $E_{blur}$ denotes a blur data term, $E_{MV}$ denotes a multi-view data term, and $E_{reg}$ denotes a regularization term.

In an embodiment of the present disclosure, the method of multi-view deblurring for 3D shape reconstruction may further include receiving camera parameters from the cameras having captured the images.

In an embodiment of the present disclosure, the camera parameters may include intrinsic parameters including focal length, and extrinsic parameters including camera position and orientation.

To achieve another object of the present disclosure, a computer-readable recording medium according to an embodiment has a computer program recorded thereon for performing the method of multi-view deblurring for 3D shape reconstruction.

To achieve still another object of the present disclosure, a device for multi-view deblurring for 3D shape reconstruction according to an embodiment includes: a multi-view image receiving unit configured to receive images captured by multiple synchronized cameras at multiple viewpoints; an image deblurring unit configured to perform iteratively estimation of depth map, latent image, and 3D motion at each viewpoint for the received images; a completion determination unit configured to determine whether image deblurring at each viewpoint is completed; and a 3D reconstruction unit configured to perform 3D reconstruction based on final depth maps and latent images at each viewpoint.

In an embodiment of the present disclosure, the completion determination unit may be configured to determine whether estimation of depth map, latent image, and 3D motion at each viewpoint is performed a preset number of times.

In an embodiment of the present disclosure, the image deblurring unit may be based on one reference view from the multiple viewpoints for the depth map and the 3D motion.

In an embodiment of the present disclosure, the 3D motion may be represented as a 3D vector.

In an embodiment of the present disclosure, the image deblurring unit may use an energy model integrating image deblurring and 3D reconstruction.

In an embodiment of the present disclosure, the energy model may be expressed as the following Equation:

$$E=E_{blur}+E_{MV}+E_{reg}$$

where $E_{blur}$ denotes a blur data term, $E_{MV}$ denotes a multi-view data term, and $E_{reg}$ denotes a regularization term.

In an embodiment of the present disclosure, the multi-view image receiving unit may be configured to receive camera parameters from the cameras having captured the images.

In an embodiment of the present disclosure, the camera parameters may include intrinsic parameters including focal length, and extrinsic parameters including camera position and orientation.

According to the method of multi-view deblurring for 3D shape reconstruction of the present disclosure, a unified framework integrating deblurring and 3D reconstruction problem through 3D representation of blur kernel is proposed, and this framework enables the full use of spatiotemporal information, which enhances the performance not only in 3D reconstruction but also in deblurring. Further, an integrated energy model is presented to guarantee spatial coherency and temporal coherency between multi-view images.

BRIEF DESCRIPTION OF THE DRAWINGS

FIG. 5 is a block diagram of a device for multi-view deblurring for 3D shape reconstruction according to an embodiment of the present disclosure.

DETAILED DESCRIPTION

Figure 1:
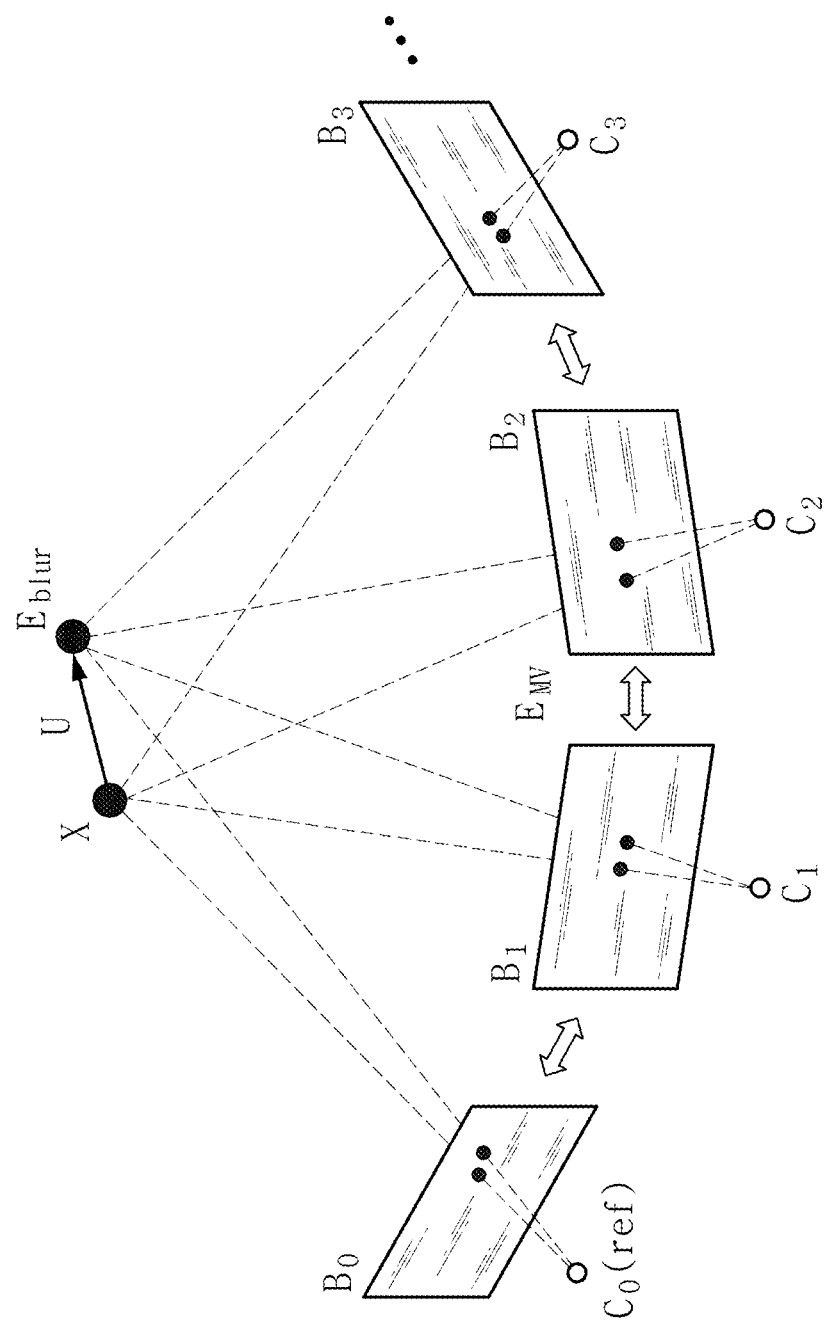
FIG. 1 is a conceptual diagram for illustrating multi-view stereo deblurring for 3-dimensional (3D) shape reconstruction of the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but not necessarily mutually exclusive. For example, particular shapes, structures and features described herein in connection with one embodiment can be embodied as other embodiment without departing from the spirit and scope of the present disclosure. It should be further understood that changes can be made to locations or arrangements of individual elements in each disclosed embodiment without departing from the spirit and scope of the present disclosure. Accordingly, the following detailed description is not intended to be construed in limiting senses, and the scope of the present disclosure is only defined, if appropriately described, by the appended claims together with the subject matter to which the claims are entitled and equivalents thereto. In the drawings, similar reference numerals denote same or similar functions in many aspects.

Hereinafter, preferred embodiments of the present disclosure will be described in further detail with reference to the accompanying drawings.

Figure 2:
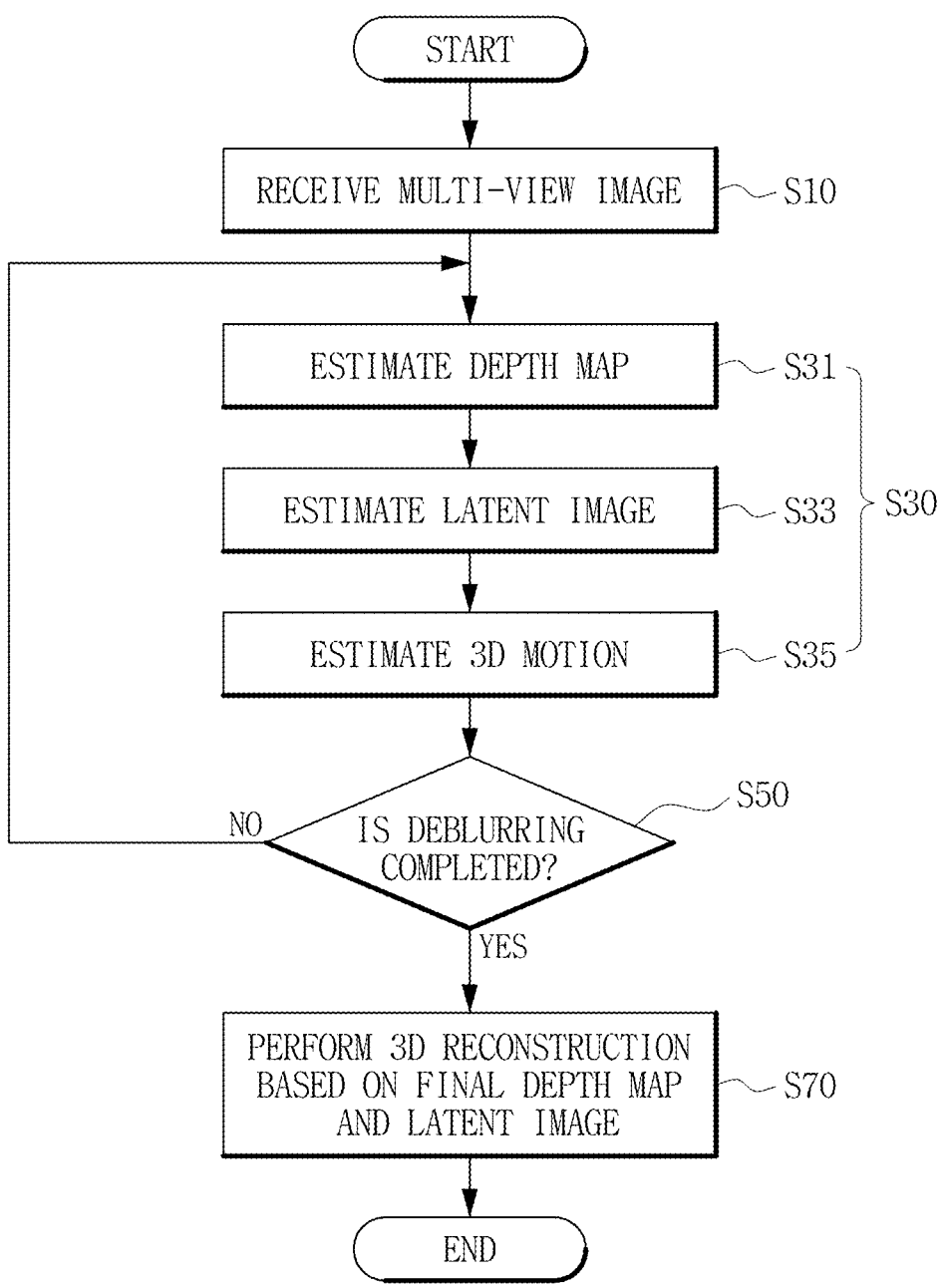
FIG. 2 is a flowchart of a method of multi-view deblurring for 3D shape reconstruction according to an embodiment of the present disclosure.

FIG. 1 is a conceptual diagram for illustrating multi-view stereo deblurring for 3-dimensional (3D) shape reconstruction of the present disclosure. FIG. 2 is a flowchart of a method of multi-view deblurring for 3D shape reconstruction according to an embodiment of the present disclosure.

In 3D facial reconstruction, blur is caused by local object motion such as human facial expression change or head movement. This motion blur makes it difficult to find correspondences in multi-view images and results in the degradation of the consequent reconstruction quality.

There is an approach to solve blur caused by object motion in a single image, but applying it to each image obtained at multiple viewpoints is not suitable for 3D reconstruction. Because deblurring results do not correspond to the same moment, geometric consistency between multi-view images is destroyed.

The method proposed by the present disclosure solves the problem by presenting an energy model integrating deblurring and 3D reconstruction. The key for integration of the two processes is representation of blur kernel on 3D. This 3D representation can guarantee spatial coherency and temporal coherency between multi-view images.

As the blur kernel is represented using an actual 3D motion instead of projected 2D motions, the present disclosure preserves geometric consistency of blur kernels and images of each viewpoint, and accordingly, the integration of deblurring and 3D reconstruction improves mutual performance.

Image deblurring enhances correspondences and enables better 3D reconstruction, and better deblurring is enforced by utilizing multi-view geometric consistency of blur kernels and images through 3D information. Accordingly, instead of iterative combination of two methods, the proposed unified framework through 3D representation allows maximal utilization of spatiotemporal information.

Referring to FIG. 1, each of multiple cameras captures images of a moving object at multiple viewpoints. The cameras are located at positions corresponding to each viewpoint. Although FIG. 1 illustrates four cameras, the present disclosure is not limited thereto and includes two or more cameras.

In FIG. 1, X denotes an actual position of the object, and U denotes 3D motion of the object. $B_i$ denotes an image at $i^{th}$ viewpoint, and $C_i$ denotes an $i^{th}$ camera.

An image $B_0$ of the object is captured by a camera $C_0$ positioned at a viewpoint set as reference view from the multiple viewpoints. Furthermore, cameras $C_1$, $C_2$, $C_3$, . . . , are positioned at each viewpoint in a sequential order from the reference view, and blurry images $B_1$, $B_2$, $B_3$, . . . are captured by each camera $C_1$, $C_2$, $C_3$, . . . .

Because the moving object is captured, blurry images $B_0$, $B_1$, $B_2$, $B_3$, . . . are captured due to image overlap while the object moves from X to X+U.

Although in FIG. 1, the leftmost viewpoint is set as reference view, the present disclosure is not constrained thereto, and another viewpoint may be set as reference view, and the multiple viewpoints may be disposed at a regular interval or at different intervals.

The multiple cameras $C_0$, $C_1$, $C_2$, $C_3$, . . . with synchronized image capture time may capture images of the object. That is, at the same time, the multiple cameras $C_0$, $C_1$, $C_2$, $C_3$, . . . capture images of the same object at different viewpoints.

Referring to FIG. 2, a method of multi-view deblurring for 3D shape reconstruction according to an embodiment of the present disclosure includes receiving images captured by multiple synchronized cameras at multiple viewpoints (S10).

The received images are multi-view images $B_0$, $B_1$, $B_2$, $B_3$, . . . captured by each camera $C_0$, $C_1$, $C_2$, $C_3$, . . . in FIG. 1. Along with this, camera parameters may be received from the cameras $C_0$, $C_1$, $C_2$, $C_3$, . . . having captured the images $B_0$, $B_1$, $B_2$, $B_3$, . . . . The camera parameters may include intrinsic parameter including the focal length and extrinsic parameter including camera position and orientation.

After the images captured by the multiple synchronized cameras at multiple viewpoints are received (S10), image deblurring is performed at each viewpoint (S30).

Figure 3:
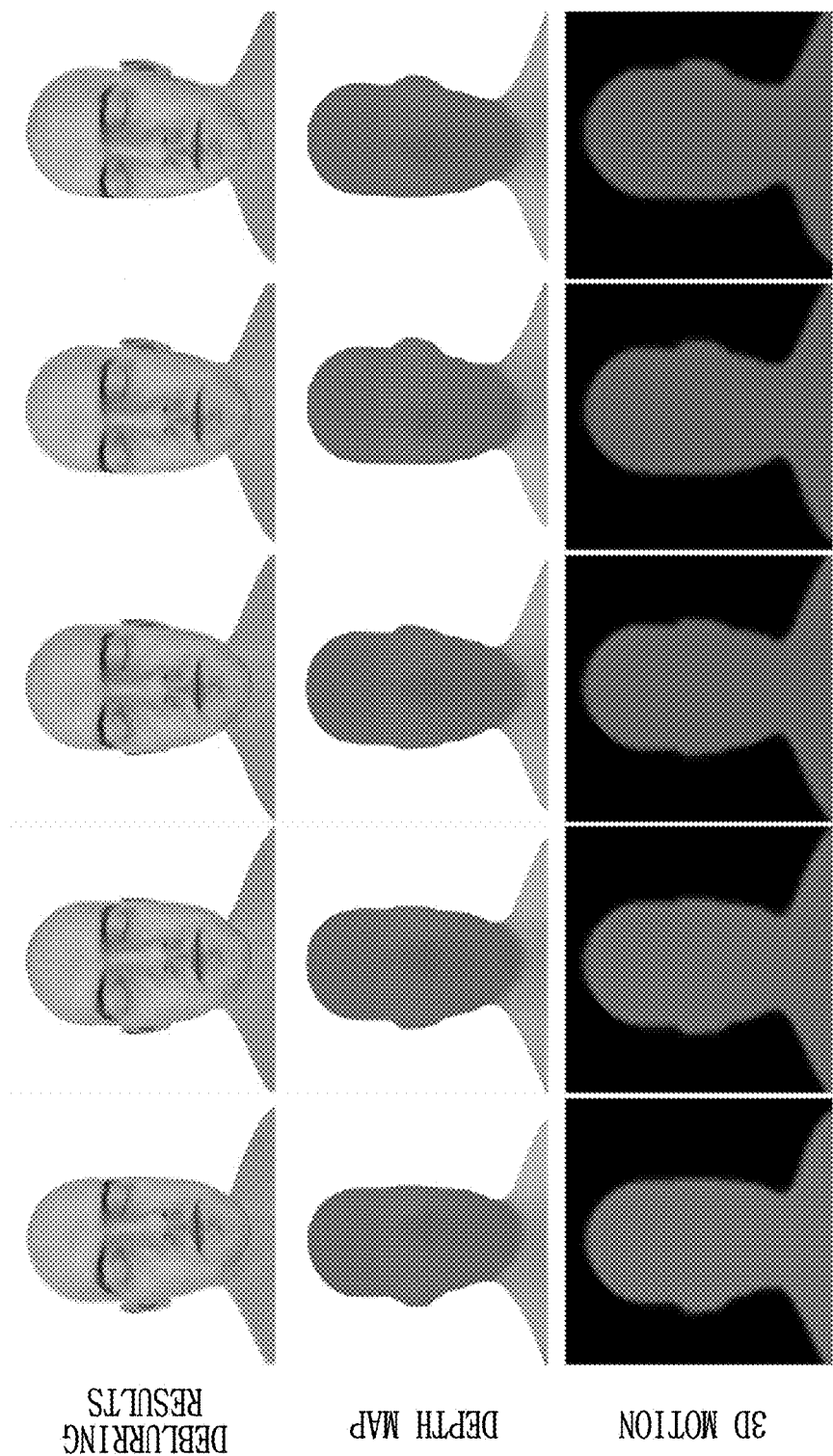
FIG. 3 is a diagram of an example of deblurring results of a method of multi-view deblurring for 3D shape reconstruction according to the present disclosure.

The step for performing image deblurring at each viewpoint (S30) includes estimating depth map, latent image, and 3D motion at each viewpoint, for the received images $B_0$, $B_1$, $B_2$, $B_3$, . . . . Referring to FIG. 3, image deblurring results at each viewpoint are shown.

The step for performing image deblurring at each viewpoint (S30) may be performed iteratively a preset number of times. That is, deblurring of a next image is performed based on the estimation results of depth map, latent image, and 3D motion at each viewpoint, and deblurring of another next image is performed based on the re-estimation results of depth map, latent image, and 3D motion at each viewpoint.

Specifically, for the images of each viewpoint, depth map is estimated (S31), latent image is estimated (S33), and 3D motion is estimated (S35).

Here, the depth map and 3D motion may be based on one reference view from the multiple viewpoints. This is a 2.5D parameter having values only at each viewpoint, and the 3D motion is a linear motion and represented as a 3D vector.

Motion blur results from factors such as camera motion, depth, and object motion. The motion blur in the context of 3D reconstruction, which is taken in the present disclosure, is attributable to depth and object motion. Motion blur has been extensively examined so far, but few studies take both depth and object motion simultaneously, and the papers examined either depth or object motion.

The present disclosure takes the depth as one of parameters representing blur kernel in the same way as earlier studies, but earlier studies represent the blur kernel with depth and camera motion, while the present disclosure represents the blur kernel with depth and 3D motion. That is, there is a difference in that earlier studies only deal with scenes free from object motion, while the present disclosure deals with scenes free from camera motion.

The present disclosure is the same with approximation of a blur as a linear motion, but represents the blur kernel with actual 3D motion instead of 2D motion projected to image. Hereinafter, representation of blur kernel through 3D motion will be explained, and using this, the energy functional that integrates deblurring and 3D reconstruction is proposed.

The energy functional is composed of blur data term $E_{blur}$, multi-view data term $E_{MV}$, and regularization term $E_{reg}$, as expressed in the following Equation 1.

$$E = E_{blur} + E_{MV} + E_{reg} \qquad \text{[Equation 1]}$$

The energy functional expressed as Equation 1 differs from conventional methods in that image deblurring and 3D reconstruction are integrated to utilize mutual information. Blur data term utilizes the 3D information for multi-view geometric consistency of blur kernel. Multi-view data term makes use of reconstructed clear images, instead of blurry images, to find better correspondence. Furthermore, advantages of 3D representation allow explicit regularization to 3D unknowns.

3D Representation of Blur Kernel

Furthermore, the present disclosure proposes the blur kernel representation parameterized by 3D motion. Since blur is determined by motions projected to 2D image, deblurring has been successfully dealt with 2D parameters. However, in the case of multi-view, deblurring of each image via 2D parameters has a limitation.

This is because blur originated from one 3D motion is represented separately by multiple 2D motions projected to each image. These multiple 2D motions are spatiotemporally decoupled and thereby disable the full use of spatiotemporal information.

On the spatial viewpoint, it is impossible to make full use of 3D spatial information of multiple viewpoints because of the separate representation of one 3D motion by multiple 2D motions. On the temporal viewpoint, it cannot guarantee that deblurring result images correspond to the same moment because each 2D motion is not based on the same moment. Accordingly, to solve these problems, the present disclosure uses a 3D motion parameter enabling the coupling of spatiotemporal information, which enforces spatial coherency and temporal coherency.

The present disclosure represents blur kernel at each viewpoint by parametrization of pixel-wise 3D linear motion. 3D motion is 2.5D parametrization based on the coordinates of reference view, and represents actual 3D motion of points corresponding to each pixel. When depth and camera parameter are given, the blur kernel at each viewpoint is represented through 3D motion, which can be represented as the following Equation 2.

$$k_i^{d,U}(x_i) = \frac{1}{\|u_i^+ - u_i^-\|} \int_{t=0}^1 \delta_{l_i(t)}(x_i) dt, \ 0 \le t \le 1,$$
$$l_i(t) = tu_i^- + (1-t)u_i^+,$$
[Equation 2]

Here, kernel $k_i(x_i)$ at each viewpoint is a function of depth d and 3D motion U, and is represented as the above Equation 2. $u_i^+$ and $u_i^-$ denote starting and end points of motion projected to 2D, respectively. $l_i(t)$ is a point on the line connecting $u_i^+$ and $u_i^-$, and δ denotes 2D dirac delta function.

The parametrization in the present disclosure integrates deblurring and 3D reconstruction through parametrization of 3D motion equivalent to scene flow. On the other hand, the present disclosure approximates 3D motion as linear and represents it as 3D vector. Although the linear approximation may not fully represent actual motion, it can yield quite favorable approximation in cases of short exposure time.

Also, the major cause of complex kernel is typically camera shake, and since cameras are fixed, the object motion can be linearly approximated with comparatively short exposure time. In particular, circular muscles or facial movements may work together, but they can be linearly approximated locally.

Energy Functional
Blur Data Term

As described above, kernel estimation problem can be represented as motion estimation problem through representation of Equation 2. By taking the actual object motion as parameter, the loss of information from modeling process can be minimized. The blur data term relating to deblurring is given as the following Equation 3.

$$E_{blur} = \lambda \sum_i \|K_i(d,U)L_i - B_i\|^2$$
[Equation 3]

Here, λ denotes the parameter that controls the weight of the blur data term, $K_i$ is the blur kernel matrix such that the row vector corresponding to the pixel $x_i$ is $k_i^{d,U}$. L and B denote the set of latent images and blurry images, respectively.

Multi-View Data Term

When camera parameters are given, finding 3D geometry of images is equivalent to finding correspondence between images. However, if the images are blurry, the matching between images becomes difficult because brightness constancy between images is violated.

Here, this problem is solved by presenting data term that finds correspondence based on reconstructed clear images instead of blurry images. The multi-view data term relating to 3D reconstruction is given as in the following Equation 4.

$$E_{MV} = \mu \sum_{i,j} |L_i(X) - L_j(X)|$$
[Equation 4]

Here, μ is the parameter that controls the weight of the multi-view data term, and X is a 3D point, which means the data term matches the pixels corresponding to the same 3D position. This enables not only the finding of correspondence but also guarantees the correlation between reconstructed images.

Regularization Term

Since solving deblurring and 3D reconstruction simultaneously is highly ill-posed problem, the regularization term is employed to alleviate the difficulty therefrom. The regularization term is applied to each of latent image, depth, and motion flow, as in the following Equation 5.

$$E_{reg} = \sum_i |\nabla L_i| + v_U g(L_{ref})|\nabla U| + v_d g(L_{ref})|\nabla d|$$
[Equation 5]

Here, $v_U$ and $v_d$ are the parameter that controls the weight of each term, and g denotes edge map.

On the other hand, in finding correspondence between images, the multi-view data term would leave unmatched parts by the occlusion due to viewpoint change. To exclude these parts from the energy functional, occlusion needs to be detected.

For this purpose, modified z-buffer may be used. In this method, the occluded parts at different viewpoint are found through current depth map. The value of depth at different view is obtained from the depth at reference view and camera parameters, and in the case several values of depth are overlapped on one pixel, all the values of depth except for the nearest one is occluded. By this way, the occluded parts are found and excluded from the energy functional.

To solve the 3D reconstruction problem in blurred multi-view images, the present disclosure presented a unified framework integrating deblurring and 3D reconstruction through 3D representation of blur kernel. Through this, it was found that utilization of spatiotemporal information allows the improved performance not only in 3D reconstruction but also in deblurring.

Each time depth map, latent image, and 3D motion at each viewpoint are estimated, counting is performed to determine whether image deblurring is completed (S50).

For example, when estimation of depth maps, latent images, and 3D motions at each viewpoint is performed a preset number of times, image deblurring may be determined to be completed. With the increasing number of iterations of image deblurring, a more accurate result can be drawn.

When image deblurring is completed (S50), 3D reconstruction is performed based on final depth maps and latent images at each viewpoint that are the last output of image deblurring (S70). The image deblurring improves temporal coherency and spatial coherency, and enhances the performance of 3D reconstruction.

In 3D reconstruction, feature points are extracted based on the input images and depth map, a correspondence relationship between the feature points is determined, and 3D positions of each feature point are estimated.

Figure 4:
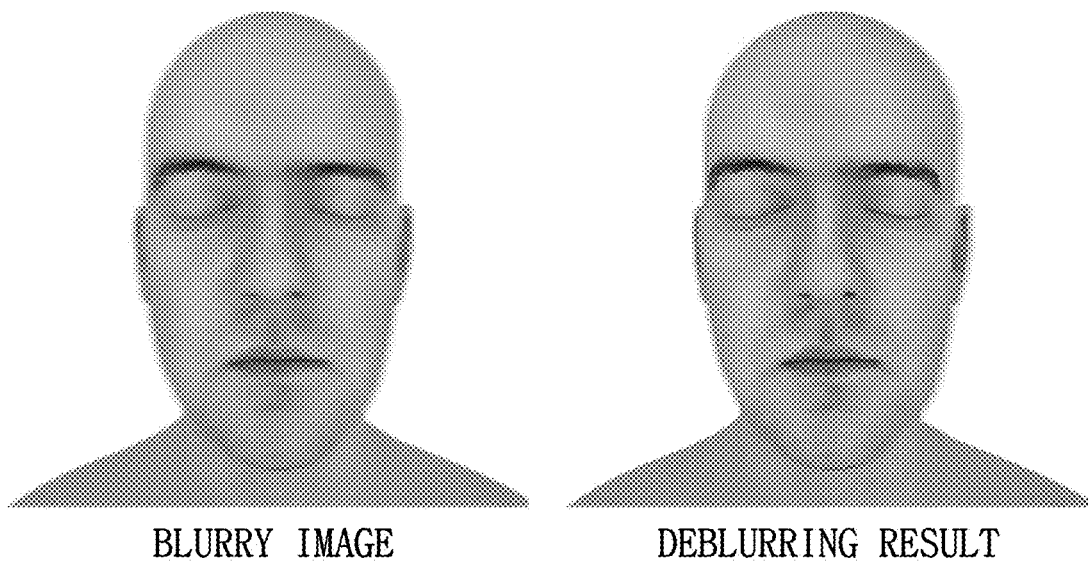
FIG. 4 is a diagram of an example of comparison between a deblurring result of a method of multi-view deblurring for 3D shape reconstruction according to the present disclosure, and a blurry image.

Referring to FIG. 4, a blurry image inputted at a viewpoint and a deblurring result image according to the present disclosure are shown. As can be seen from FIG. 4, a clearer image can be obtained according to the present disclosure.

As described above, according to the present disclosure, images captured by multiple synchronized cameras and their camera parameters are received as input, and latent image, depth map, and pixel-wise 3D motion are obtained. Furthermore, integration of image deblurring and 3D reconstruction improves mutual performance. Image deblurring enhances correspondences and enables better 3D reconstruction, and better deblurring is enforced by utilizing multi-view geometric consistency of blur kernels and images through 3D information.

The method of multi-view deblurring for 3D shape reconstruction as described in the foregoing may be embodied as an application or in the form of program instructions that can be executed through various computer components, and may be recorded in computer-readable recording media. The computer-readable recording media may include program instructions, data files and data structures, alone or in combination.

The program instructions recorded in the computer-readable recording media may be not only those designed or configured specially for the present disclosure, but also those known and available to those skilled in the field of computer software.

Examples of the computer-readable recording media include hardware devices specially configured to store and execute the program instructions, such as, magnetic media such as hard disk, floppy disk and magnetic tape, optical media such as CD-ROM and digital video disc (DVD), and magneto-optical media such as floptical disk, read-only memory (ROM), random access memory (RAM) and flash memory.

Examples of the program instructions include machine language code such as those created by a compiler, as well as a high level language code that can be executed by a computer using an interpreter. The hardware device may be configured to operate as at least one software module to perform processing according to the present disclosure, or vice versa.

FIG. 5 is a block diagram of a device for multi-view deblurring for 3D shape reconstruction according to an embodiment of the present disclosure.

The device proposed by the present disclosure solves the problem by presenting an energy model integrating deblurring and 3D reconstruction. The key for integration of the two processes is representation of blur kernel on 3D. This 3D representation can guarantee spatial coherency and temporal coherency between multi-view images.

As the blur kernel is represented using an actual 3D motion instead of 2D projected motions, the present disclosure preserves geometric consistency of blur kernels and images of each viewpoint, and accordingly, the integration of deblurring and 3D reconstruction improves mutual performance.

Image deblurring enhances correspondence and enables better 3D reconstruction, and better deblurring is enforced by utilizing multi-view geometric consistency of blur kernels and images through 3D information. Accordingly, instead of iterative combination of two methods, the proposed unified framework through 3D representation allows maximal utilization of spatiotemporal information.

Referring to FIG. 5, a device 10 for multi-view deblurring for 3D shape reconstruction according to the present disclosure (hereinafter device) includes a multi-view image receiving unit 110, an image deblurring unit 130, a completion determination unit 150, and a 3D reconstruction unit 170.

The device 10 of the present disclosure is where software (application) for performing multi-view stereo deblurring for 3D shape reconstruction is installed and executed, and configuration of the multi-view image receiving unit 110, the image deblurring unit 130, the completion determination unit 150, and the 3D reconstruction unit 170 may be controlled by the software for performing multi-view stereo deblurring for 3D shape reconstruction executed in the device 10.

The device 10 may be a separate terminal or a certain module of the terminal. For example, the device 10 may be a display device such as an image display device and an image output device, or a certain device that makes up the display device.

Furthermore, configuration of the multi-view image receiving unit 110, the image deblurring unit 130, the completion determination unit 150, and the 3D reconstruction unit 170 may be formed as an integrated module or may be composed of at least one module. To the contrary, each element may be formed as a separate module.

The device 10 may have mobility or may be stationary. The device 10 may be in the form of a server or an engine, and can be interchangeably used with the terms device, apparatus, terminal, user equipment (UE), mobile station (MS), wireless device, and handheld device.

The device 10 may execute or create a variety of software based on an operating system (OS), i.e., a system. The operating system is a system program for allowing software to use hardware of the device, and may include both mobile computer operating system such as Android OS, iOS, Windows mobile OS, Bada OS, Symbian OS and Blackberry OS, and computer operating system such as Windows-based, Linux-based, Unix-based, MAC, AIX and HP-UX.

The multi-view image receiving unit 110 receives images captured by multiple synchronized cameras at multiple viewpoints. As described in FIG. 1, each of multiple cameras $C_0, C_1, C_2, C_3, \ldots$ captures images $B_0, B_1, B_2, B_3, \ldots$ of a moving object at multiple viewpoints.

The multiple cameras $C_0, C_1, C_2, C_3, \ldots$ with synchronized image capture time may capture images of the object. That is, at the same time, the multiple cameras $C_0, C_1, C_2, C_3, \ldots$ capture images of the same object at different viewpoints.

Along with the images $B_0, B_1, B_2, B_3, \ldots$, camera parameters may be received from the cameras $C_0, C_1, C_2, C_3, \ldots$ having captured the images $B_0, B_1, B_2, B_3, \ldots$. The camera parameters may include intrinsic parameters including the focal length and extrinsic parameters including camera position and orientation.

The image deblurring unit 130 performs iteratively estimation of depth map, latent image, and 3D motion at each viewpoint, for the received images.

The image deblurring at each viewpoint may be performed iteratively a preset number of times. That is, deblurring of a next image is performed based on the estimation results of depth map, latent image, and 3D motion at each viewpoint, and deblurring of another next image is performed based on the re-estimation results of depth map, latent image, and 3D motion at each viewpoint.

Here, the depth map and 3D motion may be based on one reference view from the multiple viewpoints. This is a 2.5D parameter having values only at each viewpoint, and the 3D motion is a linear motion and represented as a 3D vector The completion determination unit 150 determines whether image deblurring at each viewpoint is completed. For example, when estimation of depth maps, latent images, and 3D motions at each viewpoint is performed a preset number of times, image deblurring may be determined to be completed. With the increasing number of iterations of image deblurring, a more accurate result can be drawn.

The 3D reconstruction unit 170 performs 3D reconstruction based on final depth maps and latent images at each viewpoint. 3D reconstruction is performed based on final depth maps and latent images at each viewpoint that are the last output of the image deblurring unit 130.

Accordingly, in case that input images are blurred and change in brightness, conventional technique cannot find precise correspondences, whereas the present disclosure can find precise correspondences for 3D reconstruction by performing 3D position estimation and deblurring simultaneously, even in case that input images are blurred.

Furthermore, conventional technique performs deblurring by representing blur kernel through 2D motion, so when it is applied to each of multi-view images captured for 3D reconstruction, spatial information is lost, causing an error in 3D reconstruction. In contrast, the present disclosure represents blur kernel through 3D position and motion between viewpoints, thereby preserving spatial information and achieving accurate deblurring and 3D reconstruction.

Conventional technique could not deal with blur caused by motion such as facial expression change because it assumed that object motion is uniform all over pixels, whereas the present disclosure can solve blur caused by any motion by estimating pixel-wise 3D motion.

Additionally, conventional technique needs to perform accurate estimation of 2D blur kernel beforehand because it estimates 3D kernel based on 2D blur kernel obtained from each input image, whereas the present disclosure directly estimates 3D kernel through spatiotemporal correspondence of multi-view images, thereby achieving more accurate deblurring and 3D reconstruction.

While the present disclosure has been described hereinabove with reference to the embodiments, it will be apparent to those skilled in the art that various modifications and changes may be made without departing from the spirit and scope of the present disclosure set forth in the appended claims.

According to the Markets and markets report, the scale of global 3-dimensional (3D) imaging market maintains an annual growth rate of 27.5%, and is expected to be 16.6 billion dollars in 2020. Accordingly, there is a possibility of having a dominant position in 3D imaging market by virtue of outstanding 3D content creating performance through this approach. Furthermore, this approach allows 3D reconstruction even in dynamic scenes, and can be used to achieve more natural 3D digital human by reconstructing actual dynamic facial expressions.

In addition, the scale of global video surveillance market maintains an annual growth rate of 16.9%, and is expected to be 42 billion dollars in 2020, and as the use of closed circuit television (CCTV) is growing, the demand for multi-view stereo analysis is increasing. In this respect, the present disclosure can be usefully applied to improve the performance of tracking and recognition technology through multi-view CCTV.

What is claimed is:

1. A method of multi-view deblurring for 3-dimensional (3D) shape reconstruction, comprising:
   receiving images captured by multiple synchronized cameras at multiple viewpoints;
   performing image deblurring by iteratively estimating a depth map, a latent image, and 3D motion at each viewpoint, for the received images;
   determining whether the image deblurring at each viewpoint is completed; and
   performing 3D reconstruction based on final depth map and latent image at each viewpoint.

2. The method of multi-view deblurring for 3D shape reconstruction according to claim 1, wherein the determining whether image deblurring at each viewpoint is completed comprises determining whether the estimating the depth map, the latent image, and the 3D motion at each viewpoint is performed a preset number of times.

3. The method of multi-view deblurring for 3D shape reconstruction according to claim 1, wherein the performing image blurring by iteratively estimating the depth map, the latent image, and the 3D motion at each viewpoint, for the received images, is based on one reference view from the multiple viewpoints, for the depth map and the 3D motion.

4. The method of multi-view deblurring for 3D shape reconstruction according to claim 3, wherein the 3D motion is represented as a 3D vector.

5. The method of multi-view deblurring for 3D shape reconstruction according to claim 1, wherein the performing image blurring by iteratively estimating the depth map, the latent image, and the 3D motion at each viewpoint, for the received images, uses an energy model integrating image deblurring and 3D reconstruction.

6. The method of multi-view deblurring for 3D shape reconstruction according to claim 5, wherein the energy model is expressed as the following Equation:

$$E = E_{blur} + E_{MV} + E_{reg}$$

where $E_{blur}$ denotes a blur data term, $E_{MV}$ denotes a multi-view data term, and $E_{reg}$ denotes a regularization term.

7. The method of multi-view deblurring for 3D shape reconstruction according to claim 1, further comprising:
   receiving camera parameters from the cameras having captured the images.

8. The method of multi-view deblurring for 3D shape reconstruction according to claim 7, wherein the camera parameters include intrinsic parameters including focal length, and extrinsic parameters including camera position and orientation.

9. A computer-readable recording medium having a computer program recorded thereon for performing the method of multi-view deblurring for 3-dimensional (3D) shape reconstruction according to claim 1, wherein the computer-readable recording medium is a non-transitory hardware device.

10. A device for multi-view deblurring for 3-dimensional (3D) shape reconstruction, comprising:
    a multi-view image receiving unit configured to receive images captured by multiple synchronized cameras at multiple viewpoints;
    an image deblurring unit configured to perform image deblurring by iteratively estimating a depth map, a latent image, and 3D motion at each viewpoint, for the received images;
    a completion determination unit configured to determine whether the image deblurring at each viewpoint is completed; and
    a 3D reconstruction unit configured to perform 3D reconstruction based on final depth map and latent image at each viewpoint.

11. The device for multi-view deblurring for 3D shape reconstruction according to claim 10, wherein the completion determination unit is configured to determine whether estimating the depth map, the latent image, and the 3D motion at each viewpoint is performed a preset number of times.

12. The device for multi-view deblurring for 3D shape reconstruction according to claim 10, wherein the image deblurring unit is configured to perform the image deblurring by iteratively estimating the depth map, the latent image, and the 3D motion at each viewpoint, for the received images, based on one reference view from the multiple viewpoints, for the depth map and the 3D motion.

13. The device for multi-view deblurring for 3D shape reconstruction according to claim 12, wherein the 3D motion is represented as a 3D vector.

14. The device for multi-view deblurring for 3D shape reconstruction according to claim 10, wherein the image deblurring unit uses an energy model integrating image deblurring and 3D reconstruction.

15. The device for multi-view deblurring for 3D shape reconstruction according to claim 14, wherein the energy model is expressed as the following Equation:

$$E = E_{blur} + E_{MV} + E_{reg}$$

where $E_{blur}$ denotes a blur data term, $E_{MV}$ denotes a multi-view data term, and $E_{reg}$ denotes a regularization term.

16. The device for multi-view deblurring for 3D shape reconstruction according to claim 10, wherein the multi-view image receiving unit is configured to receive camera parameters from the cameras having captured the images.

17. The device for multi-view deblurring for 3D shape reconstruction according to claim 16, wherein the camera parameters include intrinsic parameters including focal length, and extrinsic parameters including camera position and orientation.

* * * * *